United States Patent
Boven et al.

(10) Patent No.: US 6,187,830 B1
(45) Date of Patent: Feb. 13, 2001

(54) PROCESS FOR THE PREPARATION OF FOAMED ARTICLES

(75) Inventors: Geert Boven, Steenbergen; Gerard Henk Beijers, Babberich; Jernej Jelenic, Schalkhaar, all of (NL)

(73) Assignee: Akzo Nobel NV, Arnhem (NL)

( * ) Notice: Under 35 U.S.C. 154(b), the term of this patent shall be extended for 0 days.

(21) Appl. No.: 09/481,465

(22) Filed: Jan. 11, 2000

Related U.S. Application Data

(63) Continuation of application No. PCT/EP98/04019, filed on Jun. 24, 1998.

(30) Foreign Application Priority Data

Jul. 11, 1997 (EP) .................................................. 97202170

(51) Int. Cl.$^7$ .................................. C08J 9/08; C08J 9/10
(52) U.S. Cl. ............................ 521/81; 525/420; 525/421; 525/423; 525/425; 525/438; 525/445; 521/79; 521/135; 521/138; 264/50; 264/54
(58) Field of Search .................................... 525/420, 421, 525/423, 425, 438, 445; 521/81, 79, 135, 138; 264/50, 54

(56) References Cited

U.S. PATENT DOCUMENTS 5,482,977   1/1996  McConnell et al. ................... 521/81

FOREIGN PATENT DOCUMENTS

| 026554 | 5/1984 | (EP) . |
|---|---|---|
| 372846 | 6/1990 | (EP) . |
| 442759 | 8/1991 | (EP) . |
| 475142 | 3/1992 | (EP) . |
| 511475 | 11/1992 | (EP) . |
| 719626 | 7/1996 | (EP) . |
| 90/10667 | 9/1990 | (WO) . |
| 93/12164 | 6/1993 | (WO) . |
| 94/17131 | 8/1994 | (WO) . |
| 97/11126 | 3/1997 | (WO) . |

OTHER PUBLICATIONS

Derwent Patent Abstract No. 87–045528/07 (1987).
Derwent Patent Abstract No. 88–142635/21 (1988).
Derwent Patent Abstract No. 96–329544/33 (1996).
Patent Abstracts of Japan: JP 05117511 (1993).
Patent Abstracts of Japan: JP 09111030 (1997).
D.F. Baldwin et al., "A Microcellular Processing Study of Poly (Ethylene Terephthalate) in the Amorphous and Semi-crystalline States. Part I: Microcell Nucleation", Polymer Engineering and Science, Mid–Jun. 1996, vol. 36, No. 11, pp. 1437–1445.

*Primary Examiner*—Samuel A. Acquah
(74) *Attorney, Agent, or Firm*—Richard P. Fennelly

(57) ABSTRACT

The present invention relates to a process for the preparation of a foamed article having a foam density of less than 180 kg/m$^3$ and an average cell diameter of less than 1.5 mm comprising the extrusion of a molten semi-crystalline thermoplastic resin composition in the presence of a foaming agent, with the semi-crystalline thermoplastic resin composition comprising a polymeric epoxide containing at least two epoxide groups being a copolymer of a monomer mixture comprising at least one $C_{10}$ to $C_{18}$-olefin and at least one ethylenically unsaturated compound comprising an epoxide group. The process results in the preparation of foamed articles having a regular and homogeneous structure. Another advantage of the present invention is that it is not necessary anymore to add a compound of Group Ia, IIa, or IIIa of the Periodic Table, such as LiCl, to the extrusion process.

13 Claims, No Drawings

PROCESS FOR THE PREPARATION OF FOAMED ARTICLES

The present application is a continuation of International Patent Application No. PCT/EP98/04019, filed on Jun. 24, 1998, which claims priority to European Patent Application Serial No. EP97202170.3, filed on Jul. 11, 1997.

The present invention relates to a process for the preparation of foamed articles having a foam density of less than 180 kg/m$^3$ and an average cell diameter of less than 1.5 mm.

Conventional semi-crystalline thermoplastic resins such as aromatic polyester resins and polyamides are known to have poor melt strength. Hence, molten semi-crystalline thermoplastic resin tends to quickly collapse when foamed. Conventional foamed semi-crystalline thermoplastic resin generally also may have poor mechanical properties, due to broad differences in cell size, cell wall thickness, and the like. A method was developed which consists of saturating amorphous aromatic polyester resin at high pressure with $CO_2$ and subsequent foaming in the amorphous state. This method, however, is laborious and economically disadvantageous.

To overcome the above-mentioned disadvantages, several solutions have been proposed:

1. The use of anhydride-functional compounds such as described in JP-A-08-151470, WO 90/10667, EP-A-0 475 142, WO 94/17131, EP-A-0 442 759, EP-A-0 372 846, EP-A-0 719 626, WO 93/12164, and WO 97/11126.
2. The use of copolymers prepared from a monomer mixture comprising among others (meth)acrylic acid, alkyl (meth)acrylate and/or vinyl alcohol such as described in U.S. Pat. No. 5,482,977.
3. The use of epoxy-functional compounds such as described in EP-A-0 026 554, JP-A-62001732, and JP-A-63082955.

However, solutions 1 and 2 have to be carried out in at least two process steps. Solution 3 requires the addition of a compound of Group Ia, IIa, or IIIa of the Periodic Table in the extrusion process, such as LiCl.

The invention now provides a process for the preparation of foamed articles having a foam density of less than 180 kg/m$^3$ and an average cell diameter of less than 1.5 mm comprising the extrusion of a molten semi-crystalline thermoplastic resin composition in the presence of a foaming agent, with the semi-crystalline thermoplastic resin composition comprising a polymeric epoxide containing at least two epoxide groups and said polymeric epoxide being a copolymer of a monomer mixture comprising at least one $C_{10}$ to $C_{18}$-olefin and at least one ethylenically unsaturated compound comprising an epoxide group.

It has been found that the addition of a polymeric epoxide according to the present invention to the semi-crystalline thermoplastic resin composition results in foamed articles having a regular and homogeneous structure with a low density. Another advantage of the present invention is that it is not necessary anymore to add a compound of Group Ia, IIa, or IIIa of the Periodic Table, such as LiCl, to the extrusion process.

EP-A-0 511 475 discloses a polyester resin composition comprising an olefinic copolymer composed of an olefinic monomer and an unsaturated acid alkyl ester monomer in a molar ratio of 5:1 to 1000:1. The monomers are preferably selected from ethene and glycidyl (meth)acrylate. The polymeric epoxide of the present invention is not disclosed. Furthermore, although a foaming agent may be introduced into the polyester resin composition, it is not disclosed or suggested anywhere that the use of the present polymeric epoxides would result in such good properties in foamed articles of semi-crystalline thermoplastic resin.

The polymeric epoxide may be prepared in any conventional way. The polymeric epoxide preferably has an epoxide content of 1 to 7 moles/kg, 1.5–5 moles/kg being particularly preferred.

Preferably, the olefin has 12 to 18 carbon atoms. More preferably, the olefin is a $C_{12}$ to $C_{18}$ α-olefin, such as dodecene-1, tridecene-1, tetradecene-1, pentadecene-1, hexadecene-1, heptadecene-1, octadecene-1, and mixtures thereof.

The ethylenically unsaturated compound comprising an epoxide group preferably is an ethylenically unsaturated glycidyl ester. More preferably, this compound is elected from the group of glycidyl (meth)acrylate, itaconic acid monoglycidyl ester, butene tricarboxylic acid mono-, di-, and triglycidyl esters, α-chloroallyl glycidyl ester, maleic acid glycidyl ester, crotonic acid glycidyl ester, fumaric acid glycidyl ester, and mixtures thereof. Glycidyl (meth)acrylate is preferred.

The molar ratio between $C_{12}$ to $C_{18}$-olefin and the ethylenically unsaturated compound comprising an epoxide group preferably is 0.1–5:1, more preferably 0.4–2:1.

Optionally, other monomers may be present, such as (meth)acrylic acid esters of methyl, ethyl, propyl, butyl, 2-ethylhexyl, cyclohexyl, dodecyl, and octadecyl; monoesters or diesters of maleic acid, itaconic acid, and fumaric acid; vinyl esters such as vinyl propionate, vinyl acetate, vinyl capronate, vinyl carpylate, vinyl laurate, vinyl stearate, and vinyl trifluoroacetate; and mixtures thereof. The copolymer may comprise about 0 to 40 mole % of these monomers.

About 0.1 to 10 wt. % of polymeric epoxide, preferably 0.5 to 9 wt. %, based on semi-crystalline thermoplastic resin, may be introduced into the semi-crystalline thermoplastic resin prior to or during extrusion. However, it has been found that there is an optimum amount for each polymeric epoxide used in the process of the present invention. As it is required that a foam having a foam density of less than 180 kg/m$^3$ and an average cell diameter of less than 1.5 mm is obtained, the person of ordinary skill in the art will be able within the teachings of the present invention to provide the optimum range of amounts for the polymeric epoxide to be used. Without wishing to be bound by the following theory, we believe that the beneficial effect of the polymeric epoxide can be attributed to the positive influence of the polymeric epoxide on the melt strength of the mixture with the semi-crystalline thermoplastic resin.

The semi-crystalline thermoplastic resin is selected from the group of polyester resins, polyamide resins, and mixtures thereof. Optionally, other homo- or copolymers may be present in the semi-crystalline thermoplastic resin composition, such as polyethylene, polypropylene, polycarbonates, and mixtures thereof, in an amount of up to 20 wt. %. The polyester resin is preferred.

The polyester resin is derived from a dicarboxylic acid and a diol. The dicarboxylic acid may be selected from aliphatic dicarboxylic acids, aromatic dicarboxylic acids, and mixtures thereof. Aliphatic dicarboxylic acids include succinic acid, adipic acid, sebacic acid, and mixtures thereof. Aromatic dicarboxylic acids include terephthalic acid, isophthalic acid, naphthalene dicarboxylic acid, diphenylether dicarboxylic acid, diphenyl dicarboxylic acid, diphenylsulfone dicarboxylic acid, diphenoxyethane dicarboxylic acid, and mixtures thereof. Typical examples of the diol include polymethylene-α,ω-diols, such as ethylene glycol, trimethylene glycol, tetramethylene glycol, hexamethylene glycol, neopentyl glycol, polyethylene glycol, polypropylene glycol, polytetramethylene glycol, cyclohexane dimethylol, tricyclodecane dimethylol, 2,2-bis(4-β-hydroxyethoxyphenyl) propane, 4,4'-bis(β-hydroxyethoxy) diphenylsulfone, diethylene glycol, and mixtures thereof. Amide and carbonate compounds also may be used in the monomer mixture to prepare the polyester resin. Polyethylene terephthalate and polybutylene terephthalate are especially preferred.

The polyester resin may also include recycled polyester resin up to 100%. Industrial and/or post-consumer polyester recycled resins generally are in more than abundant supply. Accordingly, it is a further advantage of the present invention that recycled polyester resin can also be used in the present process. The melt strength and the viscosity of recycled polyester resin generally are too low to produce adequately foamed structures with practical density reductions using conventional foam technology. However, it has surprisingly been found that in the process of the present invention foamed articles can be made from recycled polyester resin without the disadvantages mentioned above.

Every conventional foaming agent may be used. Examples include inert gases such as $CO_2$ and nitrogen, hydrocarbons boiling lower than 40° C. such as propane, butane, and pentane, hydrofluorocarbons such as difluoroethane and hydrochloro fluorocarbons, and gas liberating chemical blowing agents such as sodium bicarbonate, a combination of citric acid and sodium bicarbonate, azodicarbonamide, and various endothermic blowing agents which release $CO_2$. Mixtures thereof can also be used. Solid and liquid blowing agents are used in amounts of about 0.1 to 10 wt. %, based on the weight of the semi-crystalline thermoplastic resin, 1 to 5 wt. %. $CO_2$ is preferred.

Optionally, conventional additives may be present in the semi-crystalline thermoplastic resin composition, such as nucleating agents, fillers, fibrous fillers, pigments, light stabilizers, flame retardants, surface-active compounds, and lubricants.

In a typical foam extrusion process the basic apparatus comprises a melt processing machine, such as a single extruder, a liquid injection pump, optionally a gas cylinder with injector valves, a die to form the desired product, a cooling device, and a device to collect the expanded, extruded product. In such a process generally a twin-screw extruder is used, but this is not critically necessary. The semi-crystalline thermoplastic resin composition and the desired additives can be added to the extruder feed hopper and fed to the feed section of the screw. The semi-crystalline thermoplastic resin composition is melted in the first heated section of the extruder. The polymeric epoxide can be added to the semi-crystalline thermoplastic resin composition melt by means of a liquid injection pump, as a blend with the semi-crystalline thermoplastic resin composition or "stored" in porous additives. The blowing agent can be added to the last section of the extruder as a gas or a low-boiling liquid or to the feed section as a solid. Alternatively, a two-stage process can be used in which in a first step the semi-crystalline thermoplastic resin composition is mixed with the polymeric epoxide, extruded, cooled, and pelletized. In the second step the semi-crystalline thermoplastic resin composition is melted and blown as described above. Process temperatures range for 150 to 350° C., preferably from 200 to 300° C.

Obtained are closed average cell foams with a low density, i.e. less than 180 kg/m$^3$, preferably less than 150 kg/M$^3$, most preferably from 25 to 120 kg/m$^3$. Also preferred are foamed articles having an average cell diameter of less than 1 mm.

The foamed articles may include headlining in cars, door panels, under-the-hood articles, and food trays.

The invention will be elucidated further with reference to the following Examples.

EXAMPLES

Compounds used

HPE 120-5 is a copolymer of 1-dodecene and glycidyl methacrylate in a 1:1.1 molar ratio having an epoxy content of 3.2 moles/kg.

HPE 120-2 is a copolymer of 1-dodecene, glycidyl methacrylate, and butyl methacrylate in a 1:0.6:0.7 molar ratio having an epoxy content of 1.6 moles/kg.

HPE 120-0.5 is a copolymer of 1-dodecene, glycidyl methacrylate, and butyl methacrylate in a 1:0.1:1 molar ratio having an epoxy content of 0.3 moles/kg.

HPE 180-5 is a copolymer of 1-octadecene and glycidyl methacrylate in a 1:1 molar ratio having an epoxy content of 2.6 moles/kg.

All HPEs have a degree op polymerisation of about 10.

Lankroflex® E 2307 is epoxydized soybean oil from Akcros.

Epikote® 828 is a bisglycidyl ether of bisphenol A from Shell.

ECN® 1280 is epoxy-cresol novolac from Ciba Geigy.

PET 1.6 is polyethylene terephthalate, BAGA® 5018 from Akzo Nobel (PET with a relative viscosity of 1.6).

PET scrap is bottle scrap comprising polyethylene terephthalate, from Reko.

PET 2.04 is polyethylene terephthalate, BGD® from Akzo Nobel (PET with a relative viscosity of 2.04).

PP is polypropylene HF6100 from Montell.

PP* is polypropylene Moplen® Z30S from Himont.

HDPE is high-density polyethylene, Stamylan® HD 9119 from DSM.

LDPE is low-density polyethylene, Stamylan® LD 2322 from DSM.

FEP is fluoroethylene propylene, Teflon® FEP 1 OON from DuPont.

ETFE is ethylene-tetrafluoroethylene, Tefzel® HT2010 from DuPont.

Silicone oil is Rhodorsil® 47-V-100 from Heybroek.

Methods of measurement

Cell structures were observed and average cell diameters were measured by studying thin slices of foam by light microscopy. At least 20 cell diameters were measured by means of a calibrated ruler, using an Olympus® SZ or Olympus® BH-2 light microscope. The following criteria were used:

| large | >1.5 mm |
| medium | 1–1.5 mm |
| small | 0.6–1 mm |
| very small | <0.6 mm |

Foam densities were measured by weighing a test sample and measuring the volume by water replacement measurements.

Foam production in a one-step process

In a typical foaming process, PET, chalk (1 wt. % on PET), and, optionally, a polymeric additive like polypropylene were tumble-mixed and added gravimetrically to the feeding section of the co-rotating twin-screw extruder, Berstorf® ZE25 L/D=43 effectively. In these experiments, liquid polymeric epoxide was fed to the extruder at the opening at a distance of 17 D from the feed section. $CO_2$ was added at a pressureless zone further downstream, after which pressure was gradually increased until the die opening. Bubbles were almost exclusively formed in the cylindrical die and foam expansion took place immediately after leaving the die.

Temperature profiles

In the Examples the following temperature profiles were used during extrusion, zone 1 being the unheated feeding zone and the other zones being equally spaced:

| Temperatur Profile | Zones 2–7 | 8 | 9 | die |
|---|---|---|---|---|
| A | 290 | 290 | 280 | 270 |
| C | 290 | 280 | 270 | 250 |
| E | 290 | 270 | 255 | 235 |
| F | 290 | 280 | 270 | 230 |
| G | 290 | 270 | 255 | 240 |

Examples 1–5 and Comparative Examples A–F

In Table 1, the results are listed of the use of a polymeric epoxide HPE 120-5 according to the invention. As can be seen from the results, it is not possible to foam PET in the absence of a polymeric epoxide (Comparative Example A). However, it is not possible either to obtain the required properties in the foamed article of the present invention if the polymeric epoxide is not used in optimum amounts. In the case of HPE 120-5 in combination with PET 1.6, the amounts range from 1.2 to 2.5 wt. %. Above this range the foamed article starts to crumble, below this range the average cell diameter is too large.

Examples 6–13

In Table 2, the results are listed of the use of HPE 120-5 without additive and in combination with various additives. As can be seen from these results, the required properties are obtained in each case.

Examples 14–16 and Comparative Example G

In Table 3, the results are listed of the use of HPE 180-5. The optimum amounts range from 2.5 to 5 wt. %.

Examples 17–18 and Comparative Example H

In Table 4, the results are listed for the use of HPE 120-2 and HPE 120-0.5. The latter is not a polymeric epoxide according to the invention because, on average, it does not contain two epoxide groups in one molecule. The results show that with HPE 120-0.5 it is not possible to obtain a foamed article having the required properties.

Comparative Examples I–N

Table 5 list the results of the use of epoxide compounds according to the prior art. It was not possible in Comparative Examples K and M to prepare foamed articles of which the foam density could be measured. Only with the addition of LiCl was it possible to obtain a foamed article (Comparative Examples J, L, and N). Of these latter foamed articles, only the foamed article of Comparative Example L prepared in the presence of LiCl has acceptable properties.

Examples 19–22 and Comparative Examples O–P

The results of these Examples are shown in Table 6. Different PET and recycled PET is used in combination with a polymeric epoxide. Also with these materials foamed articles are obtained which fall within the scope of the present invention.

TABLE 1

| Ex. | Resin | Additive | Wt. % Additive | Epoxide | Wt. % Epoxide | $CO_2$ (bar) | Temperature profile | Density (kg/m$^3$) | bubbles | comments |
|---|---|---|---|---|---|---|---|---|---|---|
| A | PET 1.6 | PP | 2.5 | — | — | 4 | A | — | — | $CO_2$ comes out of die |
| B | PET 1.6 | PP | 2.5 | HPE120-5 | 0.55 | 10 | A | 439 | large irregular | blisters on surface |
| C | PET 1.6 | PP | 2.5 | HPE120-5 | 0.8 | 15 | A | 282 | large very irregular | |
| D | PET 1.6 | PP | 2.5 | HPE120-5 | 1.11 | 20 | A | 182 | large | |
| 1 | PET 1.6 | PP | 2.5 | HPE120-5 | 1.575 | 25 | C | 155 | medium | |
| 2 | PET 1.6 | PP | 2.5 | HPE120-5 | 1.565 | 30 | E | 126 | medium | |
| 3 | PET 1.6 | PP | 2.5 | HPE120-5 | 1.75 | 38 | F | 114 | very small | |
| 4 | PET 1.6 | PP | 2.5 | HPE120-5 | 1.82 | 30 | E | 138 | very small | |
| 5 | PET 1.6 | PP | 2.5 | HPE120-5 | 1.96 | 35 | E | 114 | very small | |
| E | PET 1.6 | PP | 2.5 | HPE120-5 | 2.6 | 38 | E | 226 | very small | very rough surface |
| F | PET 1.6 | PP | 2.5 | HPE120-5 | 3.15 | 38 | E | 208 | very small irregular | crumbled |

TABLE 2

| Ex. | Resin | Additive | Wt. % Additive | Epoxide | Wt. % Epoxide | $CO_2$ (bar) | Temperature profile | Density (kg/m$^3$) | bubbles |
|---|---|---|---|---|---|---|---|---|---|
| 6 | PET 1.6 | — | — | HPE120-5 | 1.75 | 30 | E | 134 | medium |
| 7 | PET 1.6 | PP | 2.5 | HPE120-5 | 1.85 | 35 | E | 125 | small |
| 8 | PET 1.6 | PP* | 2.5 | HPE120-5 | 1.85 | 35 | E | 120 | very small |
| 9 | PET 1.6 | HDPE | 2.5 | HPE120-5 | 1.84 | 35 | E | 118 | very small |
| 10 | PET 1.6 | LDPE | 2.5 | HPE120-5 | 1.84 | 35 | E | 119 | very small |

TABLE 2-continued

| Ex. | Resin | Additive | Wt. % Additive | Epoxide | Wt. % Epoxide | $CO_2$ (bar) | Temperature profile | Density (kg/m$^3$) | bubbles |
|---|---|---|---|---|---|---|---|---|---|
| 11 | PET 1.6 | FEP | 2.5 | HPE120-5 | 1.84 | 30 | E | 141 | very small |
| 12 | PET 1.6 | ETFE | 2.5 | HPE120-5 | 1.82 | 30 | E | 128 | small |
| 13 | PET 1.6 | Silicone oil | 1.25 | HPE120-5 | 1.82 | 30 | E | 137 | very small |

TABLE 3

| Ex. | Resin | Additive | Wt. % Additive | Epoxide | Wt. % Epoxide | $CO_2$ (bar) | Temperature profile | Density (kg/m$^3$) | bubbles | comments |
|---|---|---|---|---|---|---|---|---|---|---|
| 14 | PET 1.6 | PP | 2.5 | HPE180-5 | 2.5 | 25 | E | 173 | medium | |
| 15 | PET 1.6 | PP | 2.5 | HPE180-5 | 3.3 | 39 | E | 144 | very small | |
| 16 | PET 1.6 | PP | 2.5 | HPE180-5 | 4 | 39 | E | 116 | very small | |
| G | PET 1.6 | PP | 2.5 | HPE180-5 | 6.75 | 39 | E | 557 | very small small number | crumbled, not foamable |

TABLE 4

| Ex. | Resin | Additive | Wt. % Additive | Epoxide | Wt. % Epoxide | $CO_2$ (bar) | Temperature profile | Density (kg/m$^3$) | bubbles | comments |
|---|---|---|---|---|---|---|---|---|---|---|
| 17 | PET 1.6 | PP | 2.5 | HPE120-2 | 6.65 | 30 | E | 154 | medium | |
| 18 | PET 1.6 | PP | 2.5 | HPE120-2 | 8.45 | 30 | E | 151 | medium | |
| H | PET 1.6 | PP | 2.5 | HPE120-0.5 | 7.9 | 10 | E | 588 | medium small number | no good foam obtained |

TABLE 5

| Ex. | Resin | Additive | Wt. % Additive | Epoxide | Wt. % Epoxide | $CO_2$ (bar) | Temperature profile | Density (kg/m$^3$) | bubbles | comments |
|---|---|---|---|---|---|---|---|---|---|---|
| I | PET 1.6 | PP | 2.5 | Lankroflex | 2.27 | 0 | G | | | not foamable |
| J | PET 1.6 | PP | 2.5 | Lankroflex | 2.27 | 20 | E | 187 | large irregular | 0.25 wt % LiCl added |
| K | PET 1.6 | PP | 2.5 | Epikote 828 | 1.13 | 10 | E | nd | large irregular | bad foam |
| L | PET 1.6 | PP | 2.5 | Epikote 828 | 1.13 | 30 | E | 131 | medium | 0.25 wt % LiCl added |
| M | PET 1.6 | PP | 2.5 | ECN | 1.1 | 10 | E | nd | large irregular | bad foam |
| N | PET 1.6 | PP | 2.5 | ECN | 0.81 | 35 | E | 237 | very small | 0.25 wt % LiCl added, very rough surface | nd = not determined

TABLE 6

| Ex. | Resin | Additive | Wt. % Additive | Epoxide | Wt. % Epoxide | $CO_2$ (bar) | Temperature profile | Density (kg/m$^3$) | bubbles |
|---|---|---|---|---|---|---|---|---|---|
| 6 | PET 1.6 | — | — | HPE120-5 | 1.75 | 30 | E | 134 | medium |
| O | PET 2.04 | PP | 2.5 | — | — | 20 | E | 533 | large irregular |
| P | PET 2.04 | PP | 2.5 | — | — | 30 | E | 1079 | small irregular |
| 19 | PET 2.04 | PP | 2.5 | HPE120-5 | 0.97 | 39 | G | 117 | small |
| 20 | PET 2.04 | PP | 2.5 | HPE120-5 | 1.78 | 39 | G | 120 | very small |
| 21 | PET scrap | PP | 2.5 | HPE120-5 | 1.48 | 25 | E | 178 | medium |
| 22 | PET scrap | ETFE | 2.5 | HPE120-5 | 1.48 | 30 | E | 150 | very small |

What is claimed is:

1. A process for the preparation of a foamed article having a foam density of less than 180 kg/M³ and an average cell diameter of less than 1.5 mm comprising the extrusion of a molten semi-crystalline thermoplastic resin composition in the presence of a foaming agent, with the semi-crystalline thermoplastic resin composition comprising a resin selected from the group consisting of polyester and polyamide resins, and further comprising a polymeric epoxide that contains at least two epoxide groups and that is a copolymer of a monomer mixture comprising at least one $C_{10}$ to $C_{18}$-olefin and at least one ethylenically unsaturated compound comprising an epoxide group.

2. A process according to claim 1 wherein a $C_{12}$ to $C_{18}$-olefin is used.

3. A process according to claim 2 wherein the $C_{12}$ to $C_{18}$-olefin is an α-olefin.

4. A process according to claim 3 wherein the α-olefin is selected from the group consisting of dodecene-1, tridecene-1, tetradecene-1, pentadecene-1, hexadecene-1, heptadecene-1, octadecene-1, and mixtures thereof.

5. A process according to claim 1 wherein the ethylenically unsaturated compound comprising an epoxide group is an ethylenically unsaturated glycidyl ester.

6. A process according to claim 5 wherein the ethylenically unsaturated glycidyl ester is selected from the group consisting of glycidyl (meth)acrylate, itaconic acid monoglycidyl ester, butene tricarboxylic acid mono-, di-, and triglycidyl esters, α-chloroallyl glycidyl ester, maleic acid glycidyl ester, crotonic acid glycidyl ester, fumaric acid glycidyl ester, and mixtures thereof.

7. A process according to claim 6 wherein the ethylenically unsaturated compound comprising an epoxide group is glycidyl (meth)acrylate.

8. A process according to claim 1 wherein the molar ratio of $C_{10}$ to $C_{18}$-olefin to the ethylenically unsaturated compound comprising an epoxide group ranges from 0.1–5:1.

9. A process according to claim 1 wherein the polymeric epoxide is present in the polyester resin composition in an amount from 0.1 to 10 wt. %.

10. A process according to claim 1 wherein the polyester resin comprises up to 100% of recycled polyester.

11. A process according to claim 1 wherein the foaming agent is $CO_2$.

12. A process according to claim 1 wherein the process is carried out in one step.

13. Foamed article prepared according to the process of claim 1.

* * * * *